US008864570B2

(12) United States Patent
Jackson

(10) Patent No.: US 8,864,570 B2
(45) Date of Patent: Oct. 21, 2014

(54) GAMING MACHINE AND GAME WITH DYNAMIC ACCUMULATIVE BONUS ROUND

(76) Inventor: Kathleen Nylund Jackson, Scituate, MA (US)

( * ) Notice: Subject to any disclaimer, the term of this patent is extended or adjusted under 35 U.S.C. 154(b) by 218 days.

(21) Appl. No.: 13/506,134

(22) Filed: Mar. 29, 2012

(65) Prior Publication Data

US 2012/0270633 A1 Oct. 25, 2012

Related U.S. Application Data

(60) Provisional application No. 61/517,477, filed on Apr. 20, 2011.

(51) Int. Cl.
*A63F 13/00* (2014.01)
*G07F 17/32* (2006.01)
*G07F 17/34* (2006.01)

(52) U.S. Cl.
CPC ............ *G07F 17/3267* (2013.01); *G07F 17/34* (2013.01)
USPC ............................................................ 463/20

(58) Field of Classification Search
CPC ......................... G07F 17/3244; G07F 17/3267
USPC ......................................... 463/16, 20, 21, 25
See application file for complete search history.

(56) References Cited

U.S. PATENT DOCUMENTS

| | | | | |
|---|---|---|---|---|
| 7,258,611 | B2 | 8/2007 | Bigelow, Jr. et al. | |
| 2002/0025846 | A1* | 2/2002 | Bennett et al. | 463/20 |
| 2004/0137982 | A1* | 7/2004 | Cuddy et al. | 463/20 |
| 2005/0026673 | A1* | 2/2005 | Paulsen et al. | 463/16 |
| 2005/0130731 | A1 | 6/2005 | Englman et al. | |
| 2005/0130737 | A1 | 6/2005 | Englman et al. | |
| 2006/0068884 | A1* | 3/2006 | Baerlocher et al. | 463/20 |
| 2009/0117990 | A1 | 5/2009 | Englman et al. | |
| 2009/0291736 | A1* | 11/2009 | Walker et al. | 463/20 |
| 2010/0160029 | A1 | 6/2010 | Walker et al. | |
| 2010/0167815 | A1 | 7/2010 | Gagner et al. | |
| 2010/0240439 | A1 | 9/2010 | Englman et al. | |
| 2010/0323779 | A1 | 12/2010 | Gagner et al. | |
| 2011/0003629 | A1 | 1/2011 | Englman et al. | |
| 2011/0098102 | A1* | 4/2011 | Gomez et al. | 463/20 |

* cited by examiner

*Primary Examiner* — Damon Pierce

(57) ABSTRACT

A method and apparatus for a gaming machine is disclosed. A wager is made to play an underlying symbol game, and if a predetermined trigger is present in the symbol game outcome, a bonus game is provided wherein a predetermined amount of free spins is provided. A first Available Benefit is made available on the first spin. If the first spin results in the first Available Benefit being achieved, a second Available Benefit is made available upon the next spin. If the first spin does not result in the first Available Benefit being achieved, the same first Available Benefit is made available upon the next spin. Each free spin offers a feature opportunity as an Available Benefit, the feature opportunity being comprised from a predetermined set of features, with each Available Benefit being activated in conjunction with all previously activated Available Benefits.

4 Claims, 17 Drawing Sheets

GAMING MACHINE AND GAME WITH DYNAMIC ACCUMULATIVE BONUS ROUND

RELATED APPLICATION DATA

This Application claims priority from U.S. Provisional Patent Application Ser. No.: 61/517,477, filed Apr. 20, 2011, and having the Title GAMING MACHINE AND GAME WITH DYNAMIC ACCUMULATIVE BONUS ROUND.

FIELD OF THE INVENTION

The present invention relates to a video slot symbol game and apparatus suitable for use in casinos and other gaming enterprises. The invention further relates to video gaming play that provides a bonus round that may evolve to accumulate multiple feature benefits that are awarded in conjunction with previously awarded feature benefits.

BACKGROUND OF THE ART

Gaming machines, whether providing video poker or slot games, have grown exponentially in numbers in the last twenty years, as have the revenues generated by such devices. It is estimated that more than 70% of any casino's revenue is now provided by gaming machines as opposed to table games.

In the gaming industry, there is a continuous need for innovative game features that will attract new players as well as keep regular players amused and therefore willing to continue playing the game. Since in virtually every casino game there is a house advantage, the longer a player remains playing at a machine, the larger the casino's profit. And since it is well recognized in the industry that players tend to easily tire of playing the same games over and over again, manufacturers must constantly develop new game features to stimulate player interest.

The majority of today's slot machines are video slots, particularly 5-reel×3-row multiple payline video slots. Especially in the last decade, these multiline machine games have been augmented by bonus games or features that are particularly popular with the gaming public. Since there is a strong desire to keep playing the base game in order to attain the bonus benefit, players spend more time on the machine in anticipation of the larger payoffs generally offered by the bonus feature.

The sense of anticipation stands at the core of multiline video gaming. With each wagered play of the base game, excitement builds as the player strives to win entrance to the bonus round, where pays are typically more lucrative. One of the drawbacks of this game play is that once a player has achieved the bonus benefit, anticipation of even greater rewards is diminished. More precisely put, when the player is playing the base game, he/she firstly wants a winning result, but even more importantly, is secondarily looking to attain entrance into the potentially more lucrative bonus round. Once in the bonus round, however, the player again looks to simply attain a winning result. There is a need to provide a bonus round that will still anticipate and make available even greater reward opportunities.

Certain prior art has attempted to enhance the known video slot machine bonus features.

U.S. Pat. No. 7,258,611 (Bigelow, Jr., et al.) includes an apparatus and method for a bonus game, and particularly a free spin bonus with an incrementing multiplier. The bonus game includes a plurality of reels having a plurality of symbols and multipliers. The gaming device provides a number of free spins to the player at the beginning of the bonus game. The multiplier preferably starts at "1.times." and increases by one after each free spin. Initially, the player spins the reels attempting to obtain a winning symbol combination on the reels. If the player obtains a winning combination, the gaming device provides an award. The award is multiplied by the multiplier and the player receives the multiplied award for that free spin. The player continues to spin the reels until there are no free spins remaining in the bonus game.

U.S. Published Pat. Nos. 20110003629, 20090117990, 20050130737, and 20050130731 (Englman et al.) teach a video wagering game that provides a feature icon that may enhance game outcomes. Various specific enhancements include (1) providing more frequent bonus game play, (2) providing a larger bonus game value payout, (3) providing more frequent bonus game play and providing a larger bonus game value payout, (4) providing a larger or multiplied game value payout, (5) providing a guaranteed value payout for a non-winning outcome, (6) providing game features (7) providing a larger game value payout based on a partial game outcome, (8) providing an extra wild symbol capable of repositioning, and (9) providing a possibility of an additional reel movement to reposition an extra reel symbol or (10) providing a possibility of an extra pay line to include an extra reel symbol to increase a value payout.

U.S. Published Pat. No.20100323779 (Gagner, Mark B.; et al.) discloses a gaming system that comprises displaying a randomly selected outcome of the primary wagering game along with a display of a feature icon, detecting a selection of the feature icon, and in response to the selection of the feature icon, displaying a feature menu on the display. The feature menu displaying a plurality of available features is capable of activation in addition to the wagering game, and in response to a first feature of the feature menu being selected, the first feature may be activated and displayed if a first eligibility requirement is satisfied.

U.S. Published Pat. No.20100240439 (Englman et al.) describes a method of video gaming in which a randomly selected outcome of the wagering game is enhanced in response to an at least one play enhancement icon on the display at any time including at least one of before spinning the reels on the display, during spinning the reels on the display, and after spinning the reels on the display.

U.S. Published Pat. No.20100167815 (Gagner, Mark B.; et al.) describes a method of providing enhanced features in a wagered game that is predicated upon an activation of the said features.

U.S. Published Pat. No.20100160029 (Walker, Jay S.; et al.) discloses a system and method of providing a player of a gaming device entitlement to a bonus amount, wherein the bonus amount may not be immediately apparent or attainable by the player.

Despite the above referenced prior art, there remains a need for a dynamic bonus feature that will provide ever-enhanced benefits that will stimulate the gaming public. Since it is well known that gamblers not only play for the win, but for the anticipation of even greater rewards as well, the present invention provides methods that offer multiple stages of anticipation, especially in bonus play mode.

SUMMARY OF THE INVENTION

A wagering game method and apparatus enabling that method may include:

a processor accepting a wager by a player on a video wagering game;

the video display screen displaying a random set of symbols used in the play of a wagering game (the display signals generated by the processor and/or memory);

the processor determining an outcome on the wagering game based on the random set of symbols (which symbols may be electronically mapped on virtual reels and/or selected from sets of symbols by an electronic random number generator). The outcome can be determined by the processor to include at least one outcome selected from the group consisting of a) a bonus event outcome that comprises at least some number X of multiple free spins and b) a winning video wagering game outcome.

During play of the bonus event outcome that comprises the at least some number X of free spins, on a first one of the at least some number X of free spins, at least one available game benefit is available as an outcome in the first one of the at least some number X of free spins, as well as a winning video wagering game outcome.

A gaming system comprises a wager input device and at least one display for displaying a video wagering game, the wagering game comprising at least an underlying base game and a related bonus game. At least one controller is operative to detect receipt of at least one wager from a first player via the wager input device. The player makes a wager to play the underlying base game, and upon a first display of symbols being displayed, and determining if a predetermined combination of symbols is present, a prize is awarded to the player if the predetermined combination of symbols is present. After initially resolving the outcome of the base game, a determination is made as to whether a trigger is present in the same said outcome, and initiating a bonus feature game if said trigger is present. The bonus game provides a predetermined amount of free spins, a first feature opportunity comprised from a set of features being made available upon the first spin as an Available Benefit. If the first spin results in the Available Benefit being achieved as a benefit (preferably by a predetermined combination of symbols being present in the free spin outcome), a second Available Benefit is made available upon the next spin. If the first spin does not result in the first Available Benefit being achieved, preferably the same first Available Benefit is made available on the next spin. Each free spin offers an Available Benefit, and each Available Benefit is activated in conjunction with all previously activated Available Benefits. In other words, once an Available Benefit has been activated, the same said benefit remains operational throughout all of the remaining free spins, the activated benefits being accumulative throughout the bonus game. Available Benefits may or may not be displayed to the player, although it is preferable and anticipated that at least the any one Available Benefit on any one spin be displayed to the player prior to the spin being initiated. The number of feature opportunities, whether the same feature opportunity, different feature opportunities, or a combination of both, preferably at least equals the number of free spins. Since any gaming establishment has a house percentage advantage over the player, it is desirable to keep the player wagering at the machine. By providing an Available Benefit on each free spin in conjunction with all previously activated benefits, the player is afforded a dynamic accumulative game play that increases excitement and an anticipation that will keep the player engaged.

DETAILED DESCRIPTION OF THE INVENTION

Figure 1:
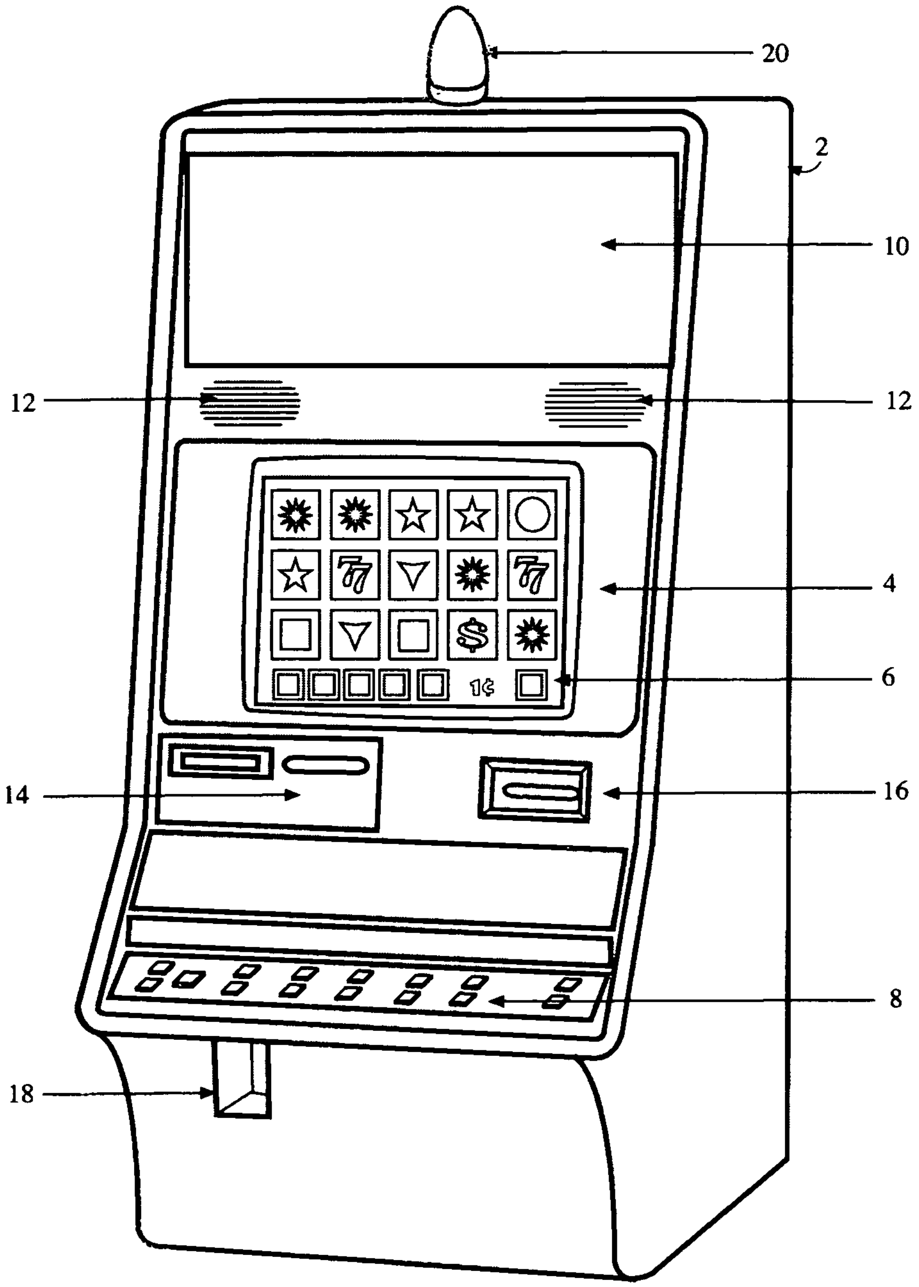
FIG. 1 shows a first gaming device capable of executing the present invention.

The technology of the present application includes a method of playing a video wagering game having a bonus event. This game is played on an electronic gaming machine (EGM). A standard EGM having a housing, video display monitor, processor and a memory in communication with the processor (internal or through an I/O port to a distal memory) may be used to support the game. The method effected and steps performed on the EGM would include at least some of:

the processor accepting a wager by a player on the video wagering game;

displaying on the video display screen a random set of symbols used in the play of a wagering game (the display signals generated by the processor and/or memory);

the processor determining an outcome on the wagering game based on the random set of symbols (which symbols may be electronically mapped on virtual reels and/or selected from sets of symbols by an electronic random number generator). The outcome can be determined by the processor to include at least one outcome selected from the group consisting of a) a bonus event outcome that comprises at least some number X of multiple free spins and b) a winning video wagering game outcome.

During play of the bonus event outcome that comprises the at least some number X of free spins, on a first one of the at least some number X of free spins, at least one available game benefit is available as an outcome in the first one of the at least some number X of free spins, as well as a winning video wagering game outcome.

If the available game benefit is achieved on the first spin of the at least some number X of free spins, that achieved game benefit is or may be activated on at least some ones of the remaining at least some number X of free spins. Alternatively, if the available game benefit is not achieved on the first spin of the at least some number X of free spins, that same available game benefit is or may be available on at least one of the remaining at least some number X of free spins, X−1 spins. The at least one available game benefit available as an outcome in the first one of the at least some number X of free spins may be selected from the group of available features at least consisting of a) a whole integer number of free spins, b) a whole integer number of free games, c) a multiplier, d) a wild symbol, e) a scatter pay f) a scatter symbol scheme with choice of symbols, g) a certain number amount of credits, h) a certain number of free credits, i) a certain number amount of money, j) a prize article, k) a prize trip, l) a prize complimentary m) additional paylines and n) a bonus game different from the video wagering game.

If an available game benefit is not won on the first spin in the at least some number X of free spins, at least one available game benefit may be or preferably will be available as an outcome on at least some remaining ones of the X−1 spins.

Alternatively, after achieving at least one available game benefit after having played less than all X spins, at least one other available gaming benefit selected from the group consisting of a), b), c), d), e), g), h), i), j), k), l), m) and n) is or may be available as an outcome.

A video gaming apparatus comprising a housing, a video display monitor in the housing, a processor in the housing and a memory in communication with the housing, wherein the processor and memory are configured to perform the methods described above and herein and to cause the symbols of the video wagering game to be displayed on the video display screen.

A gaming system comprises a wager input device and at least one display for displaying a video wagering game, the wagering game comprising at least an underlying base game and a related bonus game. At least one processor and controller are operative to detect receipt of at least one wager from a first player via the wager input device.

The present invention can be implemented using a variety of different processing apparatuses. Preferably, the invention is implemented using a computer to determine game operations, implement game rules, and perform accounting functions on wagers and outcomes. A typical computer includes a central processing unit connected to a memory. The computer has connected thereto other devices such as display screen, buttons and/or a touch screen input device, one or more front panel buttons used in the operation of the machine; a coin, credit, token, or card acceptor for allowing a player to place bets; a network card for connecting the computer to an optional central computer, and security system connections. The central computer may be used for accounting, bookkeeping, and/or security purposes, or for downloading new game software or game software upgrades to computer, and/or for controlling the operation of the game via a network. In one optional embodiment, the computer includes a memory having a more permanent first portion in which is stored the software for running games on a CPU. This more permanent memory may be a hard disk read only memory (ROM), erasable programmable read only memory (EPROM), an application specific integrated circuit (ASIC), field programmable gated array (FPGA) or even a feed through a network to a localized or central memory. A thin client network from the central computer or local game computer to the individual gaming device may alternatively be provided. All of these integrated circuit storage means are well known in the art so are not discussed further. The advantage to providing all game logic via a stored program on hard disk, or via network card from a central computer is that a game may quickly and easily be updated, or a different game program be loaded to run on the computer without having to change any integrated circuit chips, such as the ROMs, EPROMs or ASICs. When game software remains on the central computer, it permits games to be played over a local network, or over a remote network which may include the Internet. The memory also has a second portion used in playing the games. The second memory would be typically a random access memory (RAM) with memory locations associated with each of the primary game positions, secondary game positions, secondary game progressives, information display areas and soft buttons on a display. These memory locations store information about the game symbols displayed, the bets placed, winnings, the speed of the game, etceteras. Alternatively, individual game software may not be permanently stored in memory. When a player touches a game selection button, or reel set selection button or control, and a game or reel sets is selected for a game, the request may be transmitted via network or network card to a central computer and the game software is downloaded to the more permanent memory to be used by the CPU to run the game or reel set chosen by the player. This permits central control of the games to be played on specific machines, fast upgrades of game software and easier addition of software for new games.

In a further non-limiting configuration, one or more of the players can be located in separate locations, and the player terminals or hand-held devices or player screens in rooms can be connected to the controller via communication links (e.g., hardwired or wireless). Standard protocols, software, hardware and processor languages may be used in these communication links, without any known limitation. There are hundreds of available computer languages that may be used, among the more common being Ada; Algol; APL; awk; Basic; C; C++; Cobol; Delphi; Eiffel; Euphoria; Forth; Fortran; HTML; Icon; Java; Javascript; Lisp; Logo; Mathematica; MatLab; Miranda; Modula-2; Oberon; Pascal; Perl; PL/I; Prolog; Python; Rexx; SAS; Scheme; sed; Simula; Smalltalk; Snobol; SQL; Visual Basic; Visual C++; and XML.

Any commercial processor may be used either as a single processor, serial or parallel set of processors in the system. Examples of commercial processors include, but are not limited to Merced™, Pentium™, Pentium II™, Xeon™, Celeron™, Pentium Pro™, Efficeon™, Athlon, AMD and the like.

Display screens may be segment display screen, analog display screens, digital display screens, CRTs, LED screens, Plasma screens, liquid crystal diode screens, and the like.

A slot machine or other processor and a video monitor screen are provided on which symbols may be provided for use in a slot game. The reels may be positioned in a grid, preferably as a matrix of rows and columns, or may be positioned in other symmetric, asymmetric or random patterns.

The player preferably makes a wager to play the underlying base symbol game, and upon a first display of symbols being shown, and determining if a predetermined combination of symbols is present, a prize is awarded to the player if the predetermined combination of symbols is present. After initially resolving the outcome of the base symbol game, a determination is made as to whether a predetermined trigger is present in the said outcome, and initiating a bonus game if said trigger is present.

The bonus game preferably provides a predetermined amount of free bonus spins, although it is contemplated that a wager may be required in order to access the bonus game opportunity of the amount of bonus spins. A feature opportunity is offered as an Available Benefit on the first bonus spin, the feature opportunity being one of a specified or unspecified set of feature opportunities that is comprised from a set of features. For example, in a three free spins bonus game, the set of features may include, but is not limited to, free games, multipliers, wild symbols, additional paylines, additional spins, hidden prizes, bonus rewards of credits, bonus rewards of currency, and bonus rewards of casino player points, and the set of feature opportunities may be the said free games, the said wild symbols and the said additional spins. A first feature opportunity is randomly, non-randomly or non-randomly afforded the player as an Available Benefit wherein the Available Benefit is achieved by a predetermined combination of symbols present in a first free spin symbol outcome. If the first free spin results in the first Available Benefit being achieved, a second feature opportunity comprised from the set of feature opportunities that may include the first feature opportunity is made available to the player on the next spin as a second Available Benefit. If the first spin does not result in the first Available Benefit being achieved, preferably the same first Available Benefit is made available on the next spin, although it is contemplated that a second feature opportunity comprised from the set of feature opportunities may be made available as the Available Benefit on the next spin.

Each spin preferably offers an Available Benefit, and each benefit achieved is activated in conjunction with all previously achieved benefits. Available Benefits may or may not be displayed to the player, although it is preferable and anticipated that the any one Available Benefit on any one spin be displayed to the player prior to the said spin being initiated so as to increase anticipation. The amount of feature opportunities, whether the same feature opportunity, different feature opportunities, or a combination of both, preferably at least equals the amount of free or wagered spins. By way of example, a bonus game with seven free spins would have seven feature opportunities; the player who succeeds in achieving an Available Benefit activation on each and every spin would activate all seven Available Benefits, each Available Benefit being activated in conjunction with all previous Available Benefit activations. On the other hand, if the player achieves or activates only three Available Benefits, only the first three of the seven Available Benefits would be achieved or activated during the seven free spins, each Available Benefit being activated in conjunction with all previous Available Benefit activations.

In a first preferred embodiment of the present invention, a base game is offered wherein if a predetermined trigger is present, a predetermined bonus game is initiated, the predetermined bonus game being a predetermined amount of free spins. A set of feature opportunities comprised from a predetermined set of features, including but not limited to free games, multipliers, awards of extra credits, awards of extra cash, wild symbols, additional spins, hidden prizes, and so forth, may or may not be displayed to the player. A single feature opportunity is then randomly, non-randomly or pseudo-randomly chosen from the set of feature opportunities and displayed to the player as an Available Benefit for the first free spin. A predetermined symbol result in the first spin causes the activation of the Available Benefit as an actual benefit on the same said first spin and all remaining free spins. For instance, if a 5× multiplier is the Available Benefit on the first spin, and if a predetermined symbol result is present in the first free spin symbol outcome, any wins in the first spin and in all proceeding spins will be multiplied by five. A new and preferably different Available Benefit is then randomly, non-randomly or pseudo-randomly chosen from the set of feature opportunities (preferably minus the feature opportunity offered and won on the first spin) as a second Available Benefit for a next free spin. If the outcome of the first spin does not contain the predetermined symbol result that activates the Available Benefit as an actual benefit, the same first Available Benefit is offered as the Available Benefit on the next spin. Play continues as described until the number of Remaining Free Spins is zero.

Those trained in the art will appreciate that these play options are exemplary and are not intended to dictate an exclusive method of play, nor limit or restrict specific gameplay.

Reference to the Figures will assist in further understanding of the practice of the present invention.

FIG. 1 illustrates a gaming machine that includes at least a cabinet 2 and monitor screen 4 capable of displaying a video gambling game 6. The video gambling game comprises at least a symbol game and touchscreen buttons or physical buttons 8 that enable a player to play the video wagering game. An additional video monitor screen 10 may be provided, upon which game theme graphics may be displayed. The gaming machine or apparatus preferably also includes speakers 12, and a value input/output device 14 that allows a player to insert value for game play or extract value of said game play. A separate device 16 is provided that preferably enables a player card or ticket to be inserted for the purpose of keeping track of player information, providing information of benefits or events, and the like. In rarer or older examples, a coin output device 18 may be provided. An electronic signaling device 20 may be apportioned on the top of the gaming machine to signal information of wins or needs to the appropriate people or employees.

Figure 2:
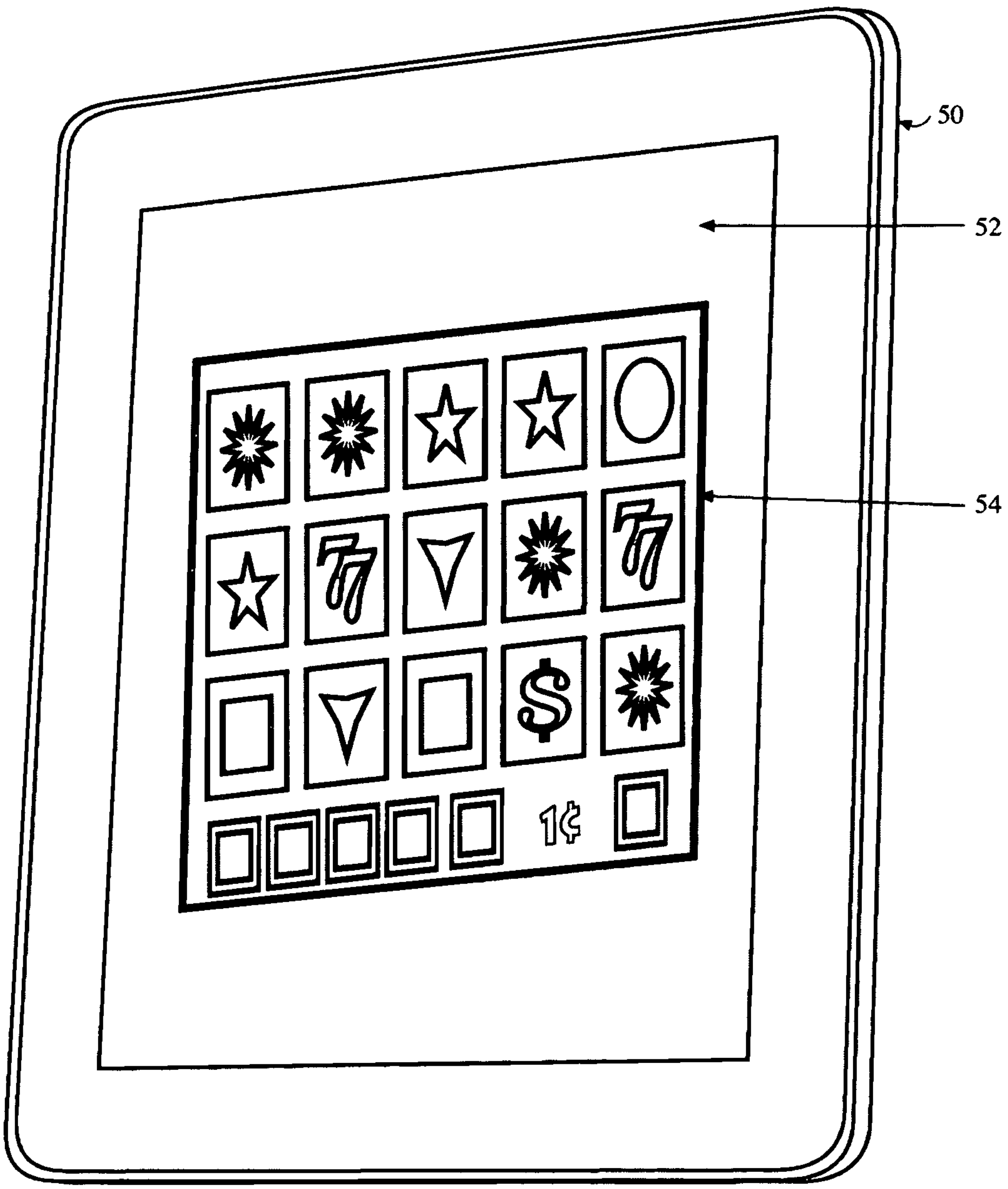
FIG. 2 shows a second device capable of executing the present invention.

FIG. 2 illustrates an alternate device 50 capable of displaying and playing a video wagering game 54 on a screen monitor 52. The said devices may include at least a desktop computer, a laptop computer, an iPad®-like device, or an iPhone®-like device.

Figure 3:
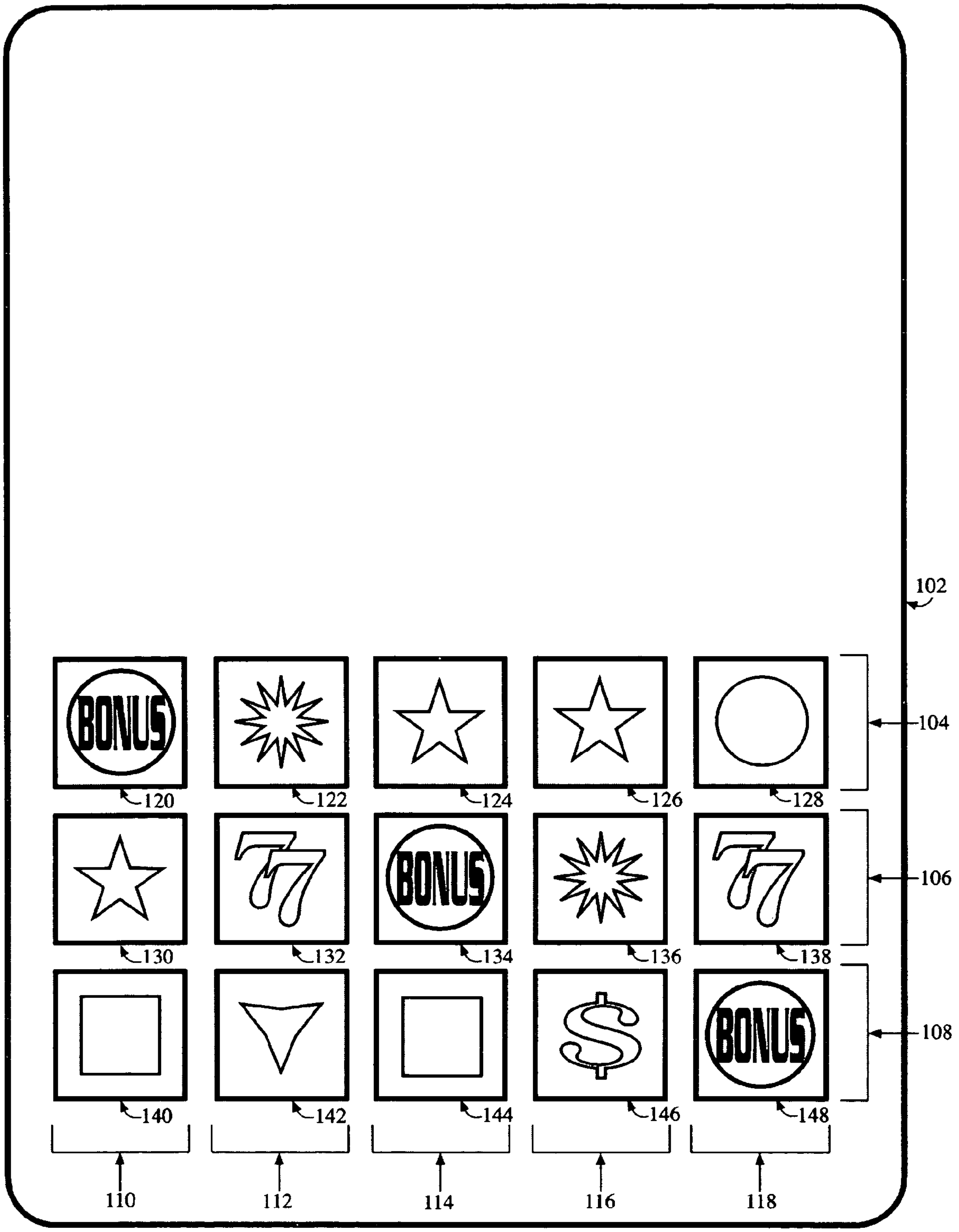
FIG. 3 shows a monitor screen of a slot machine with the outcome of a base game spin providing entry into a bonus game.

FIG. 3 shows a slot machine monitor screen 102 with the result of the completed base game spin after the player has wagered to play the base game. Fifteen individual symbol area boxes (120, 122, 124, 126, 128, 130, 132, 134, 136, 138, 140, 142, 144, 146, 148) are arranged in a three-row (104, 106, 108) by five-column (110, 112, 114, 116, 118) matrix. A bonus symbol appears in each of three symbol area boxes (120, 134, 148), constituting a predetermined symbol result that affords the player entrance into a free spins bonus game.

Figure 4:
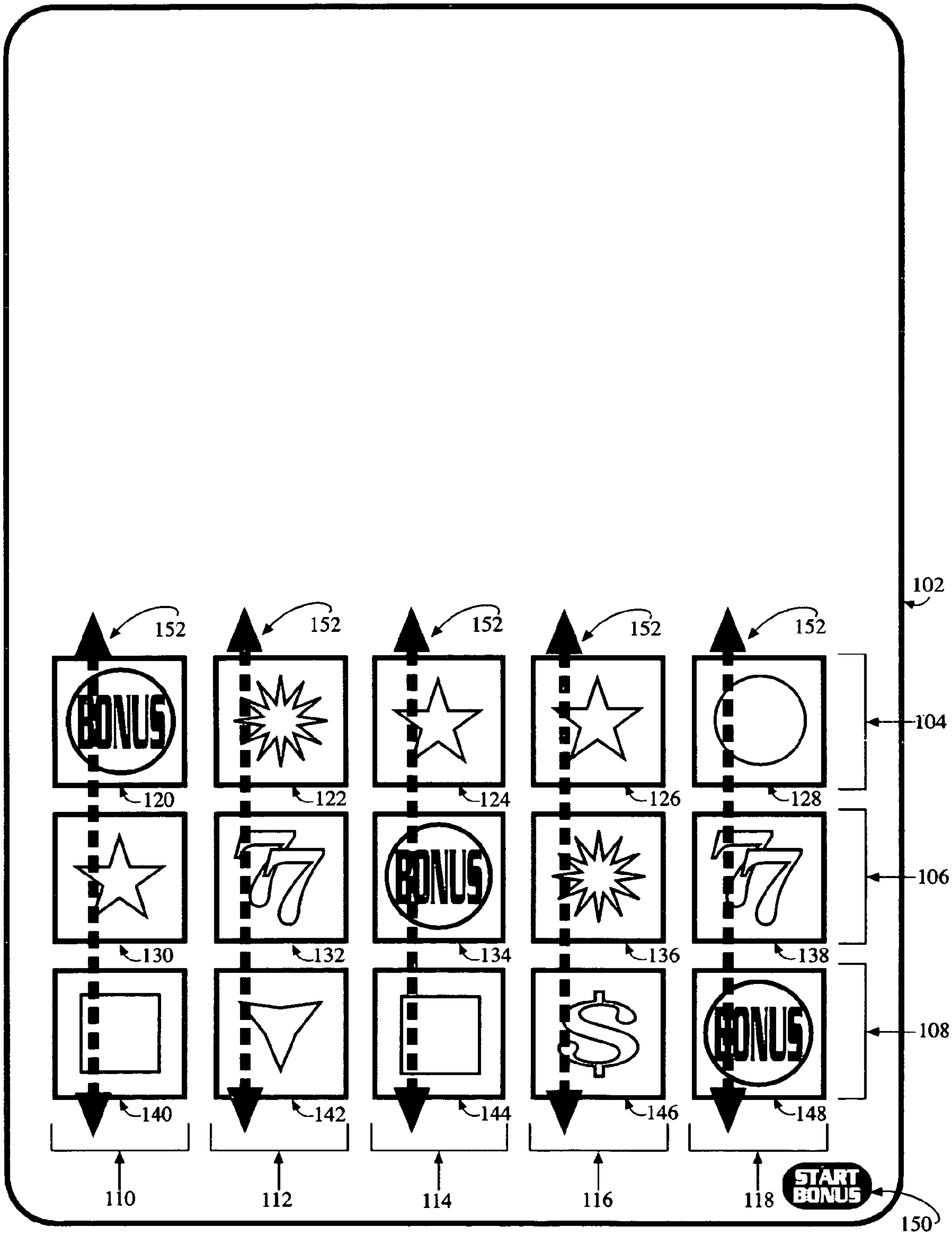
FIG. 4 shows the reels spinning as the first free spin of the bonus game is initiated.

FIG. 4 refers to the game elements shown in FIG. 3 and displays a Start Bonus touchscreen button 150. The bonus game is initiated by the player pressing the Start Bonus button or by the processor automatically selecting the Start Button activation, either of which causing the reels to spin 152.

Figure 5:
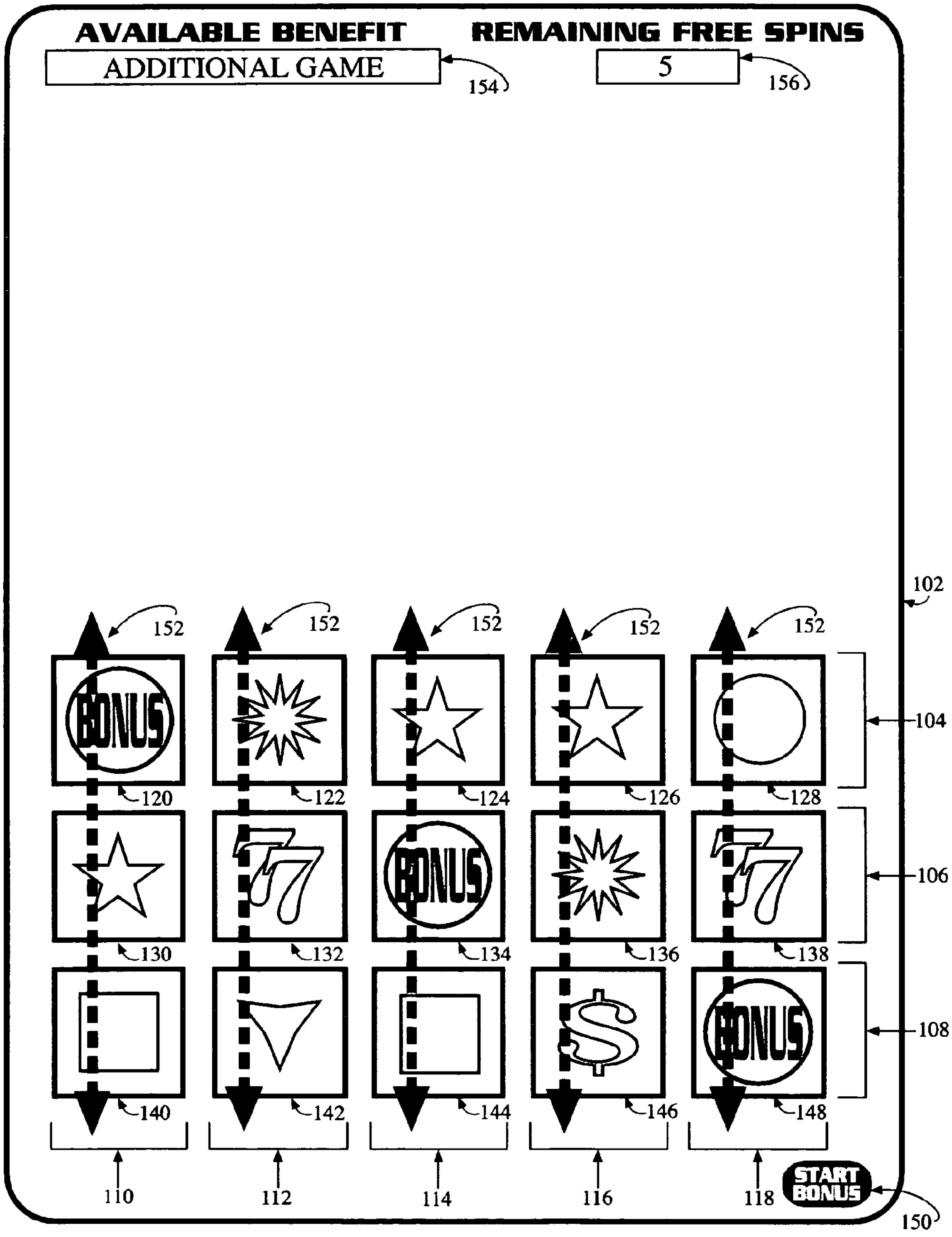
FIG. 5 shows the Available Benefit of an Additional Game being offered on the first free spin, and the amount of 5 Remaining Free Spins.

FIG. 5 refers to the game elements shown in FIG. 4, with the display of an Available Benefit 154 and the amount of Remaining Free Spins 156. It should be noted that these two said displays may be shown prior to initiating the bonus and spinning the reels, concurrent with initiating the bonus and spinning the reels, or subsequent to initiating the bonus and spinning the reels. It is also contemplated that as an option, a total set of available feature opportunities may be displayed, but that only one feature be displayed as the current Available Benefit. Whether displayed as only showing the Available Benefit, or as a single Available Benefit shown from the total set of available feature opportunities, a preferred embodiment of the present invention provides at least the amount of feature opportunities as there are free spins. In this illustrated embodiment of the present invention, the first Available Benefit indicated provides the player with an opportunity to be awarded an Additional Game if a predetermined symbol combination is present within the first of five spin results. As way of example, the predetermined symbol combination illustrated is three Extra Game symbols displayed on at least three reels. The total number of Remaining Free Spins is five.

Figure 6:
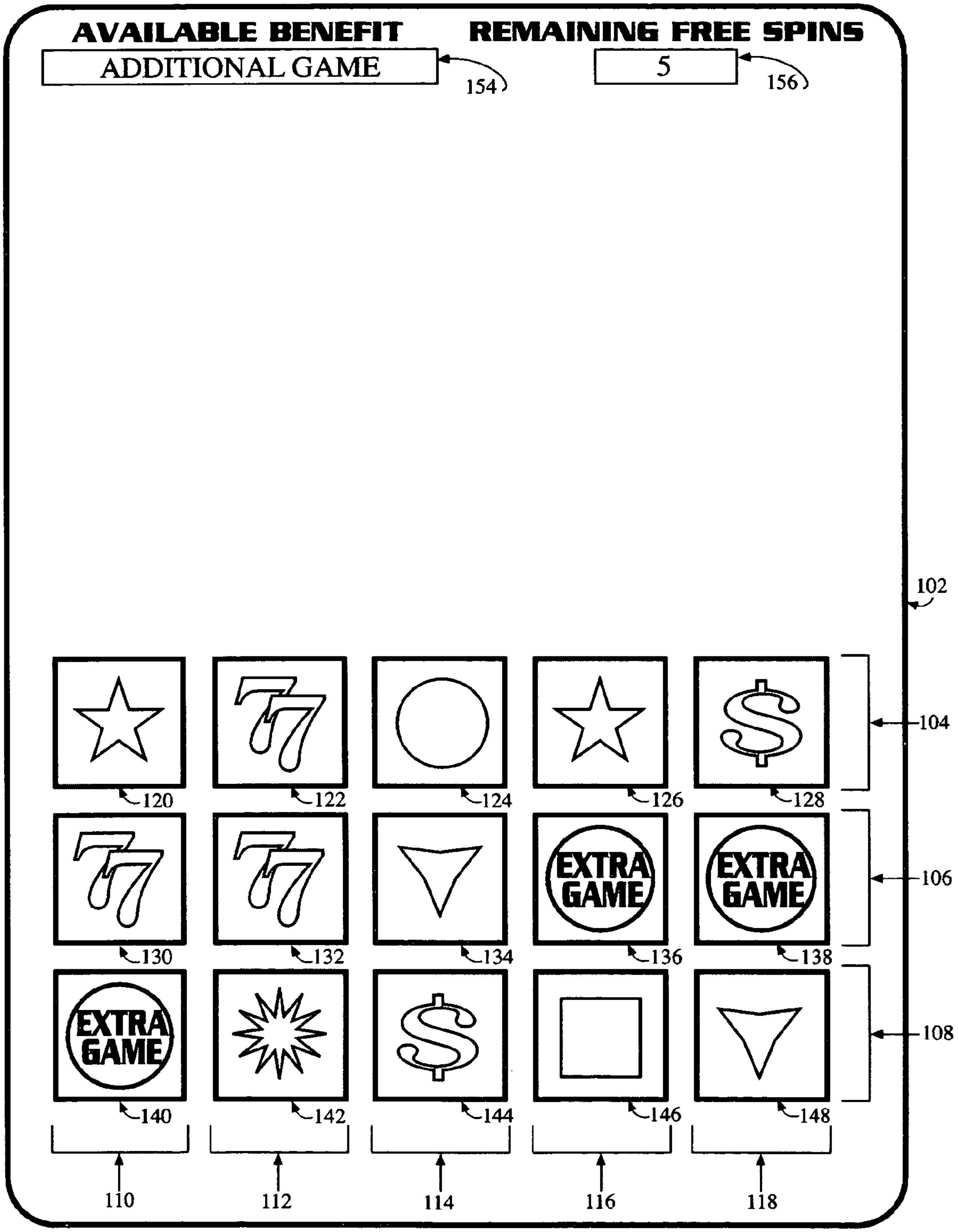
FIG. 6 shows the end result of the first free spin, with the symbol game resulting in an Additional Game being achieved.

FIG. 6 refers to the game elements shown in FIG. 5 with the result of the first free spin. Here there is no win indicated in the first bonus game; however, the predetermined symbol combination (three Extra Game symbols [136, 138, 140]) is displayed within the first free spin result.

Figure 7:
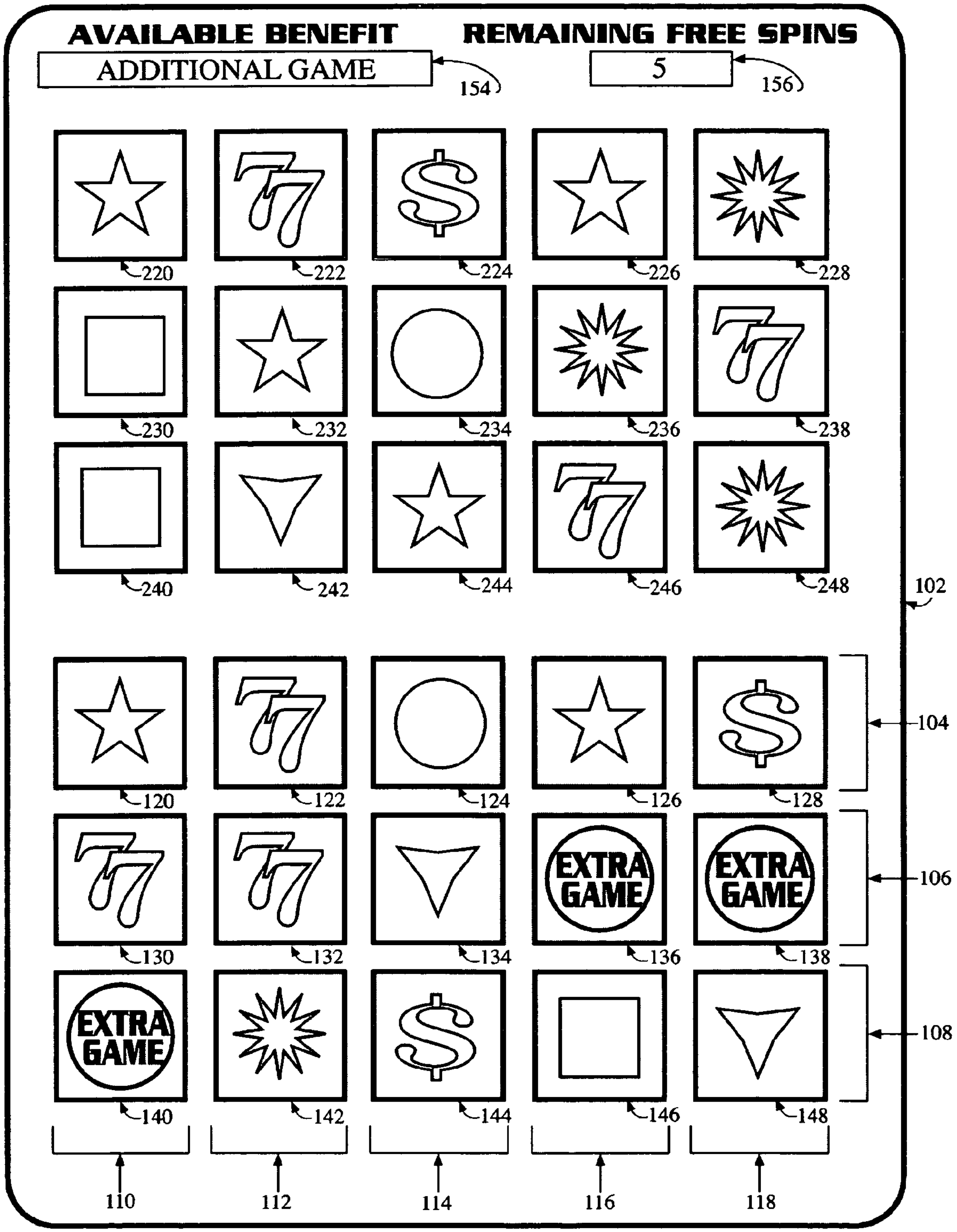
FIG. 7 shows the Additional Game being provided as a secondary symbol game.

FIG. 7 refers to the game elements shown in FIG. 6 with an Extra Game grid (secondary game) being displayed due to the result of the predetermined symbol combination (136, 138, 140). The Extra Game grid consists of fifteen individual symbol area boxes (220, 222, 224, 226, 228, 230, 232, 234, 236, 238, 240, 242, 244, 246, 248).

Figure 8:
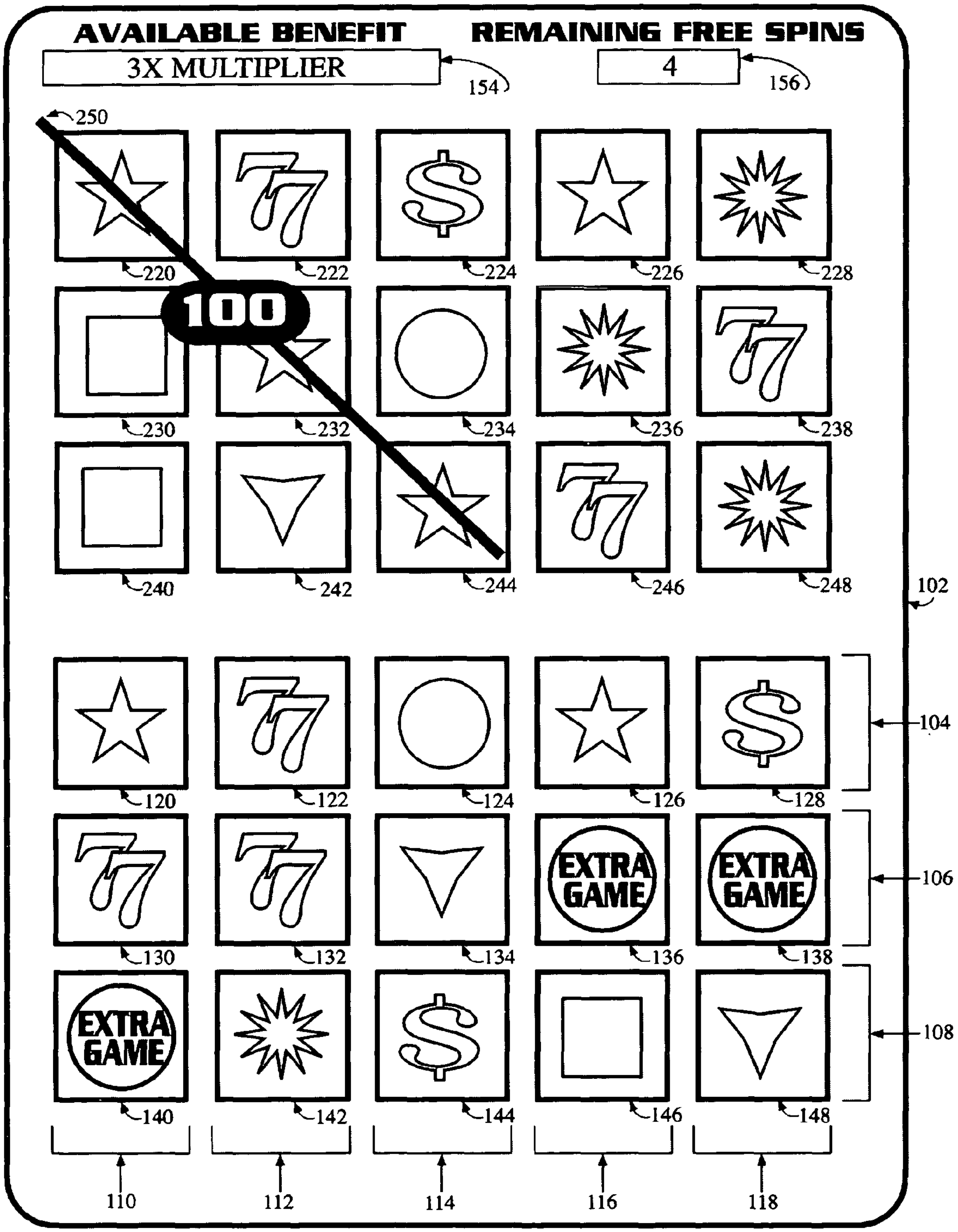
FIG. 8 shows a win of 100 credits in the Additional Game, a new Available Benefit of a 3× Multiplier, and the amount of 4 Remaining Free Spins.

FIG. 8 refers to the game elements shown in FIG. 7 with no win indicated in the original bonus game and a win of 100 credits 250 being shown in the displayed the secondary game, the winning symbol combination being a Star in symbol area boxes 220, 232, and 244. The amount of Remaining Free Spins is now is displayed as four, and since the Available Benefit (Extra Game) has been activated, the next and now Available Benefit is a 3× Multiplier.

Figure 9:
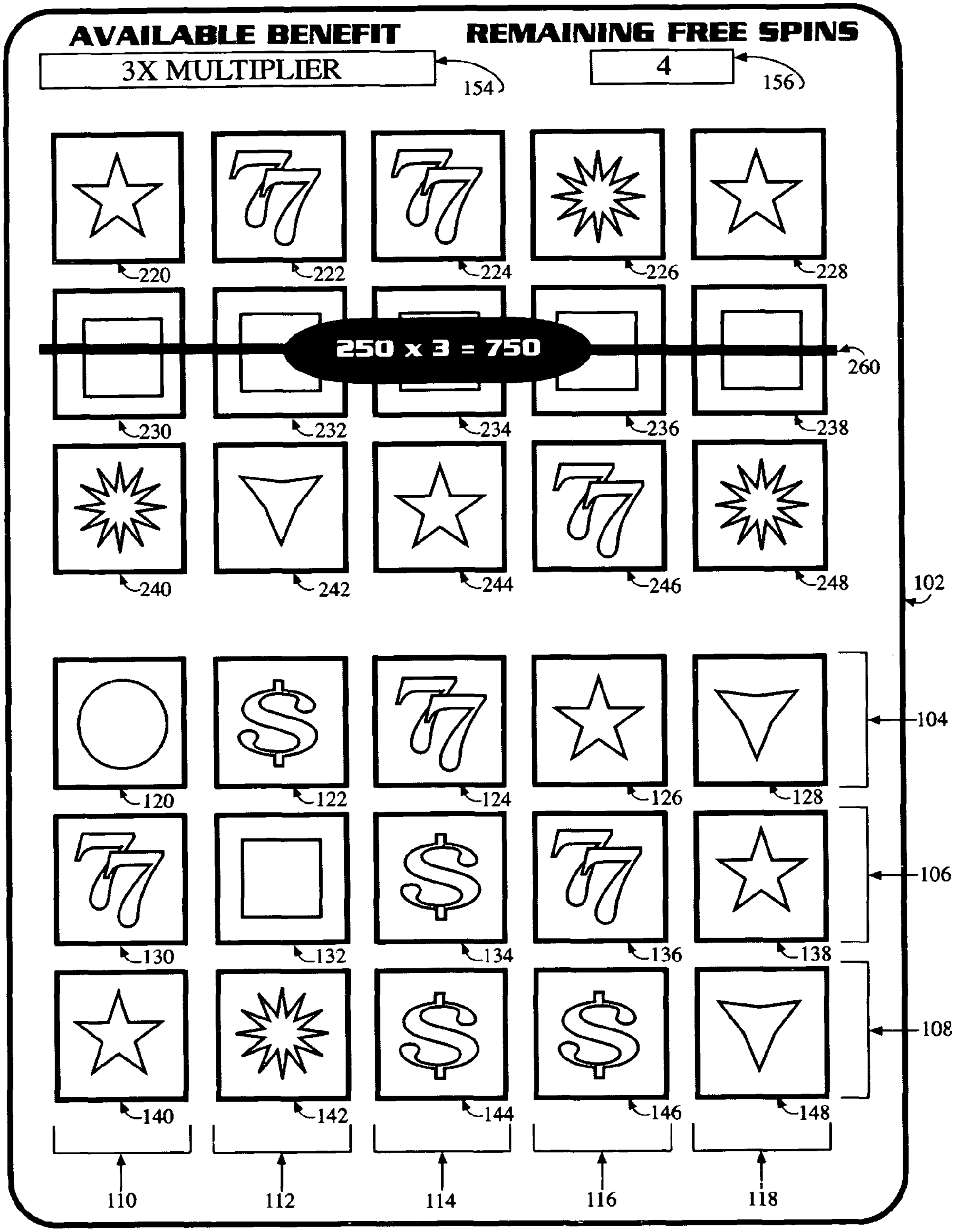
FIG. 9 shows the end result of the second free spin, the result comprising the first symbol game and the secondary symbol game, with a 3× win in the secondary symbol game.

FIG. 9 refers to the game elements shown in FIG. 8 with the result of the second spin being no win indicated in the original bonus game and a win of 750 credits (250 credits multiplied by 3) 260 being shown in the displayed secondary game, the winning symbol combination being Squares in symbol area boxes 230, 232, 234, 236, and 238.

Figure 10:
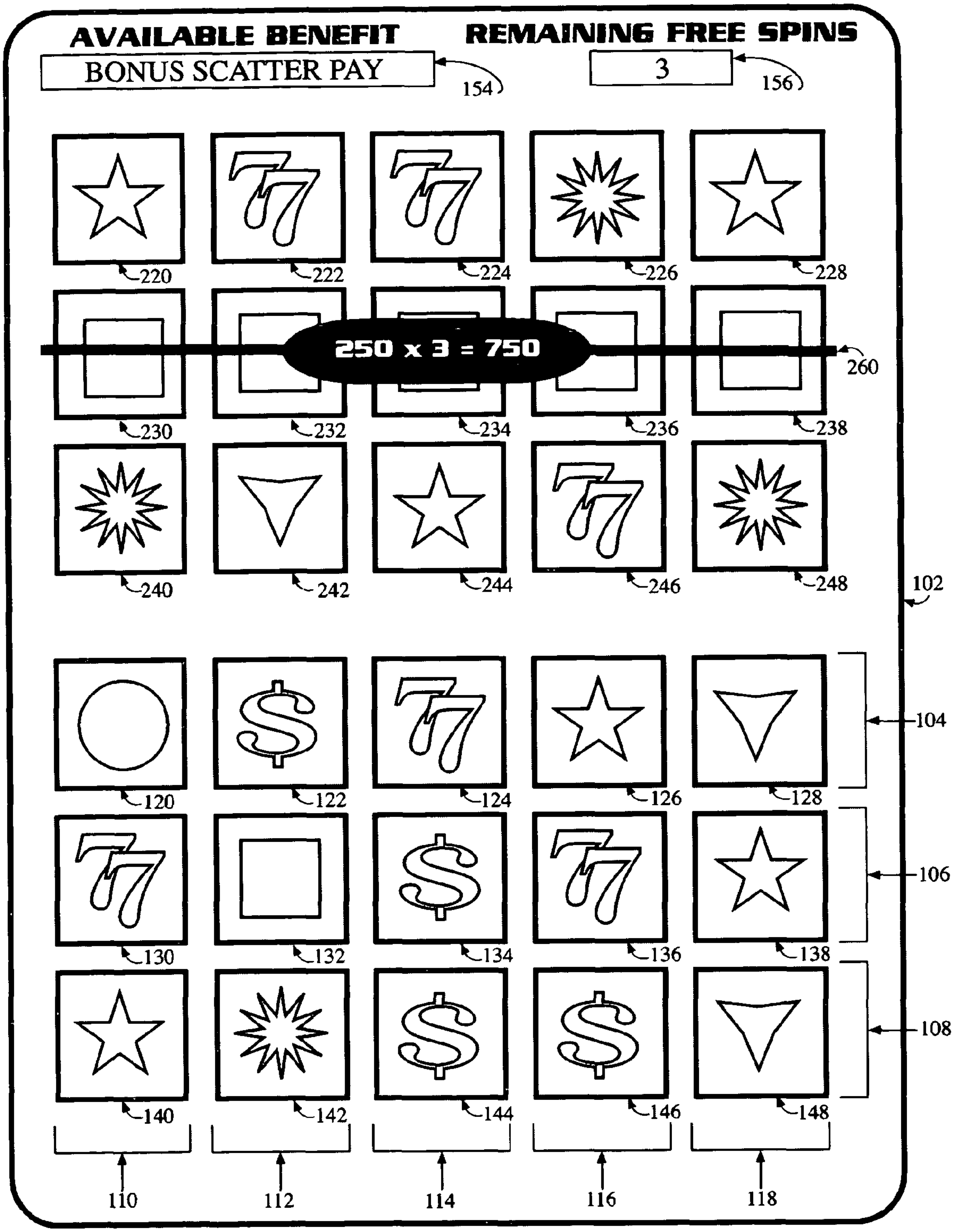
FIG. 10 shows the bonus game prior to initiating a third free spin, with a new Available Benefit of a Bonus Scatter Pay, and the amount of 3 Remaining Free Spins.

FIG. 10 refers to the game elements shown in FIG. 9 with the Remaining Free Spins being now displayed as three, and the now Available Benefit being a Bonus Scatter Pay.

Figure 11:
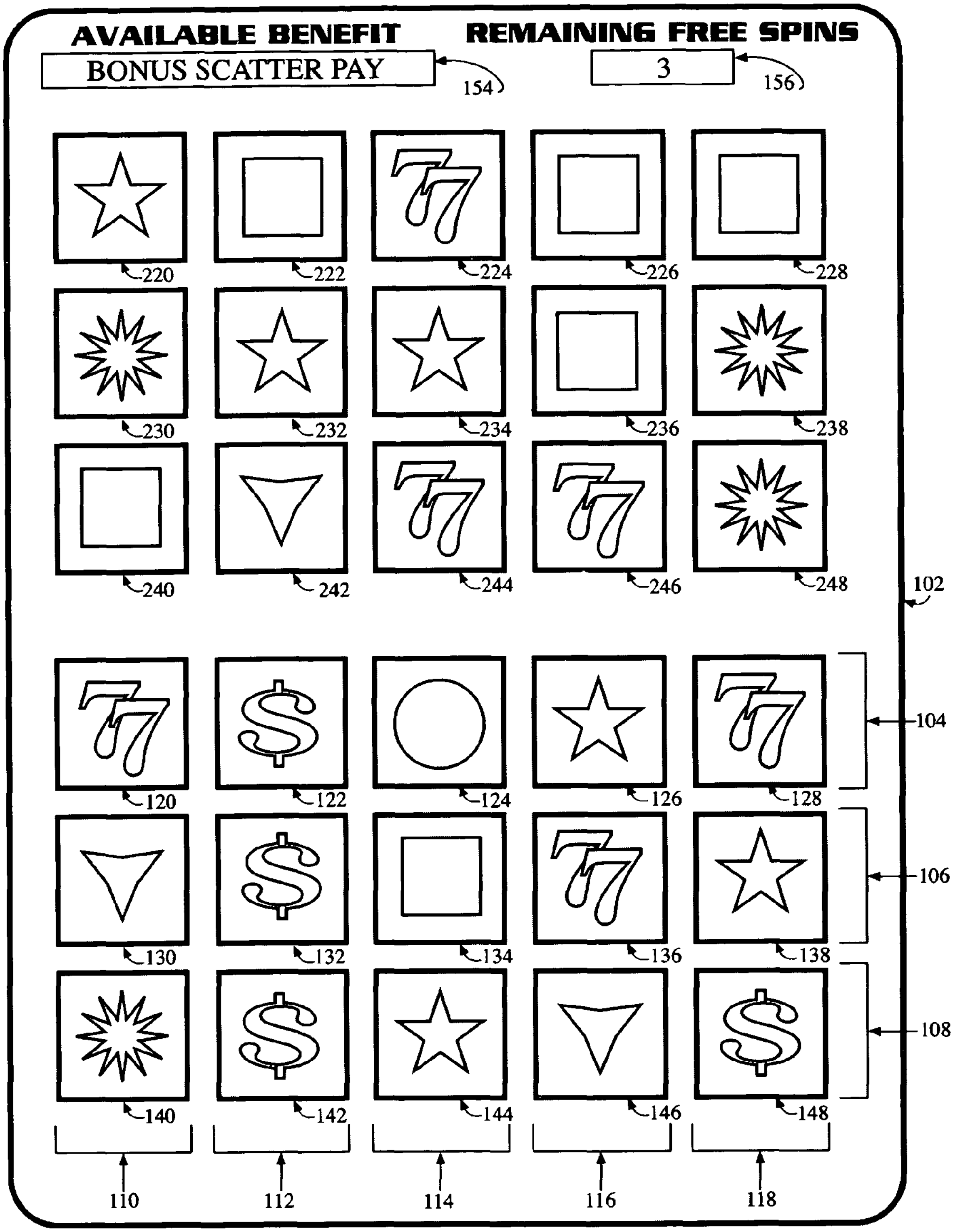
FIG. 11 shows the end result of the third free spin, the non-winning result comprising the first symbol game and the secondary symbol game.

FIG. 11 refers to the game elements shown in FIG. 10 with the result of the third free spin being no wins. It should be reiterated that even though there are no wins in this third free spin, the achieved benefits comprising the secondary game and the 3× Multiplier are still operational.

Figure 12:
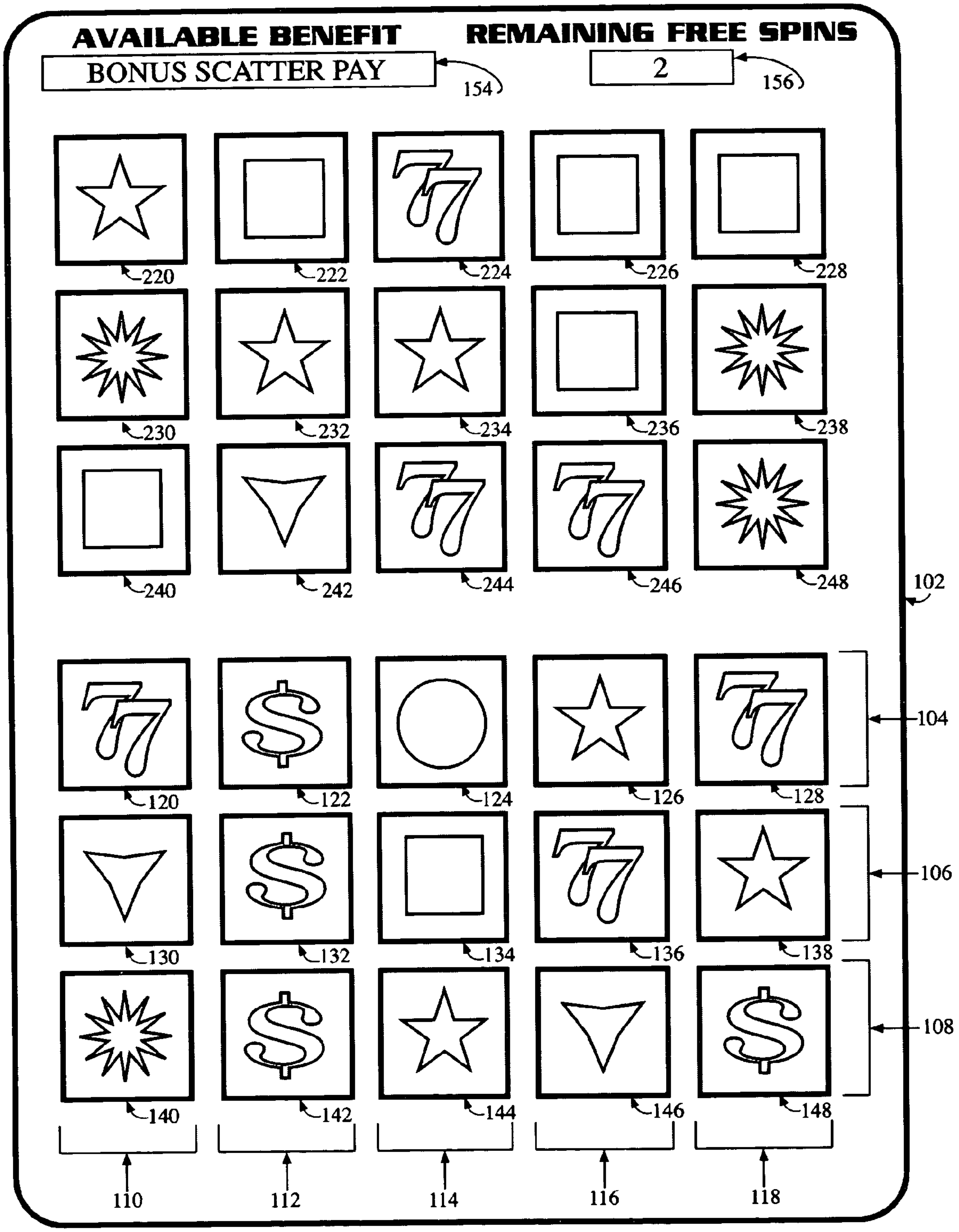
FIG. 12 shows the bonus game prior to initiating a fourth free spin, with the same Available Benefit of a Bonus Scatter Pay, and the amount of 2 Remaining Free Spins.

FIG. 12 refers to the game elements shown in FIG. 11 with the Remaining Free Spins being now displayed as two, and the now Available Benefit still being a Bonus Scatter Pay.

Figure 13:
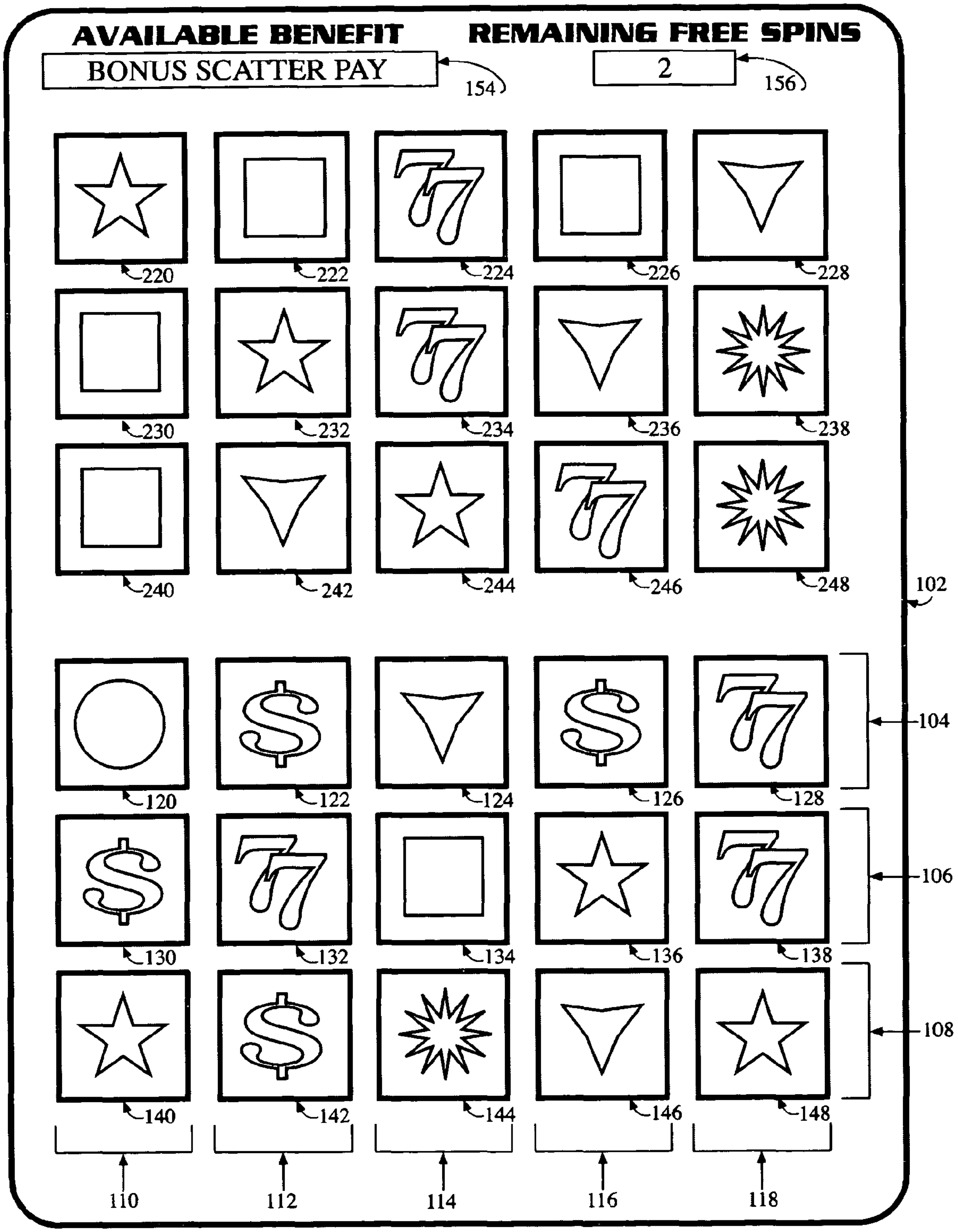
FIG. 13 shows the end result of the fourth free spin, the result comprising the first symbol game and the secondary symbol game.

FIG. 13 refers to the game elements shown in FIG. 12 with the result of the fourth free spin being no win indicated in the original bonus game and a symbol combination of three stars in symbol area boxes (220, 232, 244) in the secondary game.

Figure 14:
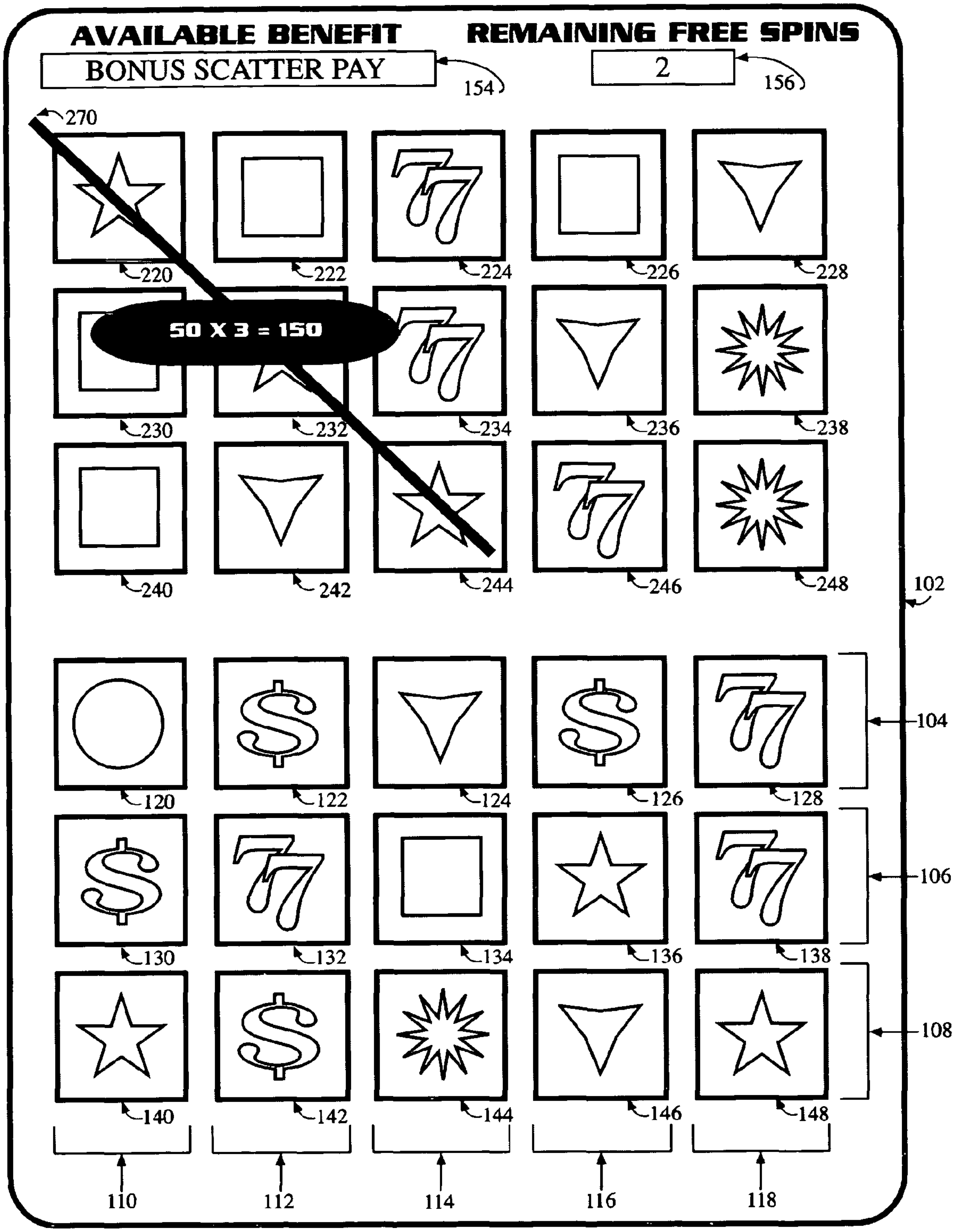
FIG. 14 shows a 3× win in the secondary symbol game.

FIG. 14 refers to the game elements shown in FIG. 13 with the win of three stars in symbol area boxes (220, 232, 244) in the secondary game being awarded 50 credits×3, or 150 credits in total. It is important to note that any achieved benefits in prior spins will continue to be operational in all subsequent spins. In this spin, the 50 credit win for the symbol combination in the secondary game is multiplied by three.

Figure 15:
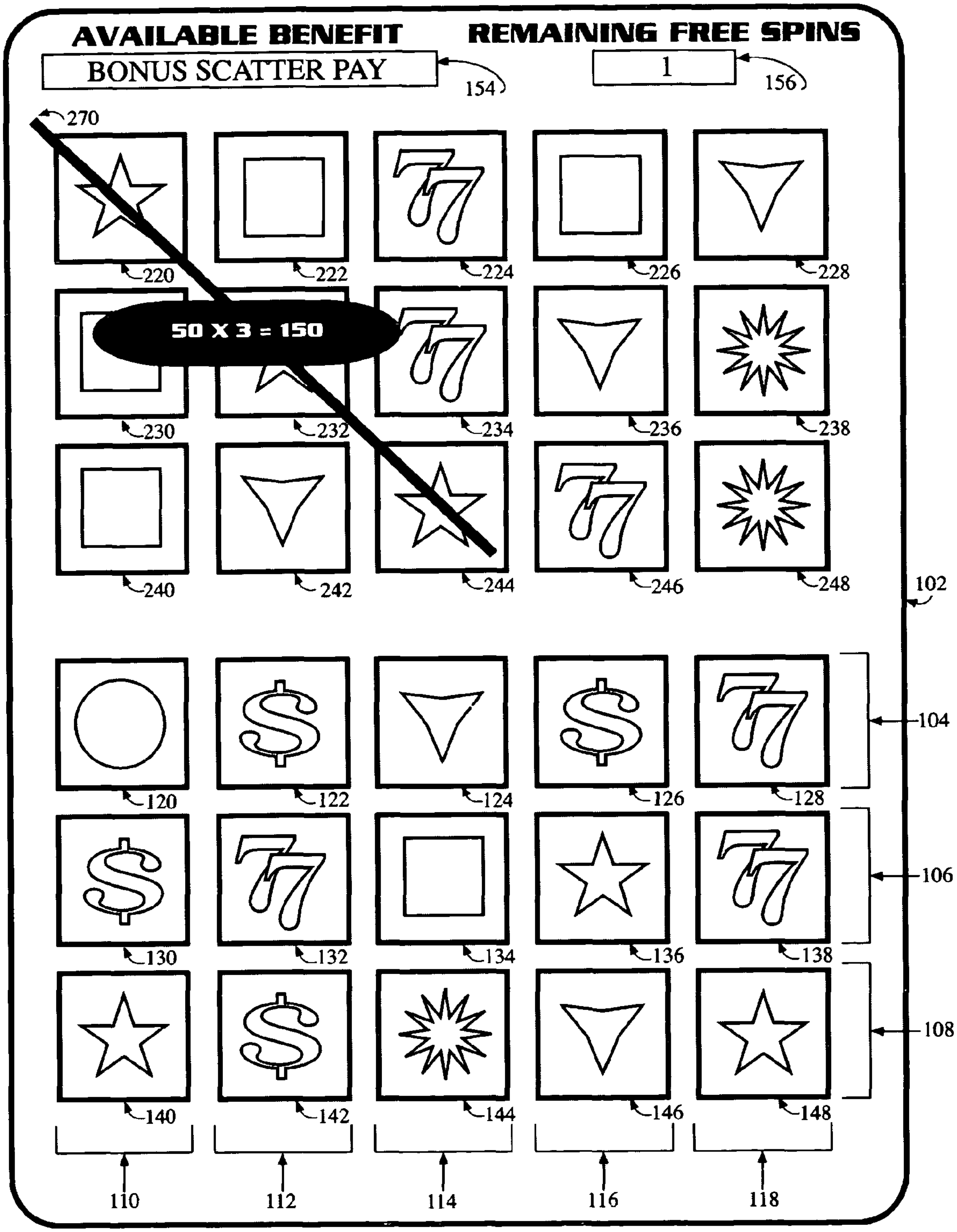
FIG. 15 shows the bonus game prior to initiating a fifth free spin, with the same Available Benefit of a Bonus Scatter Pay, and the amount of 1 Remaining Free Spin.

FIG. 15 refers to the game elements shown in FIG. 14 with the Remaining Free Spins being now displayed as one, and the now Available Benefit still being a Bonus Scatter Pay.

Figure 16:
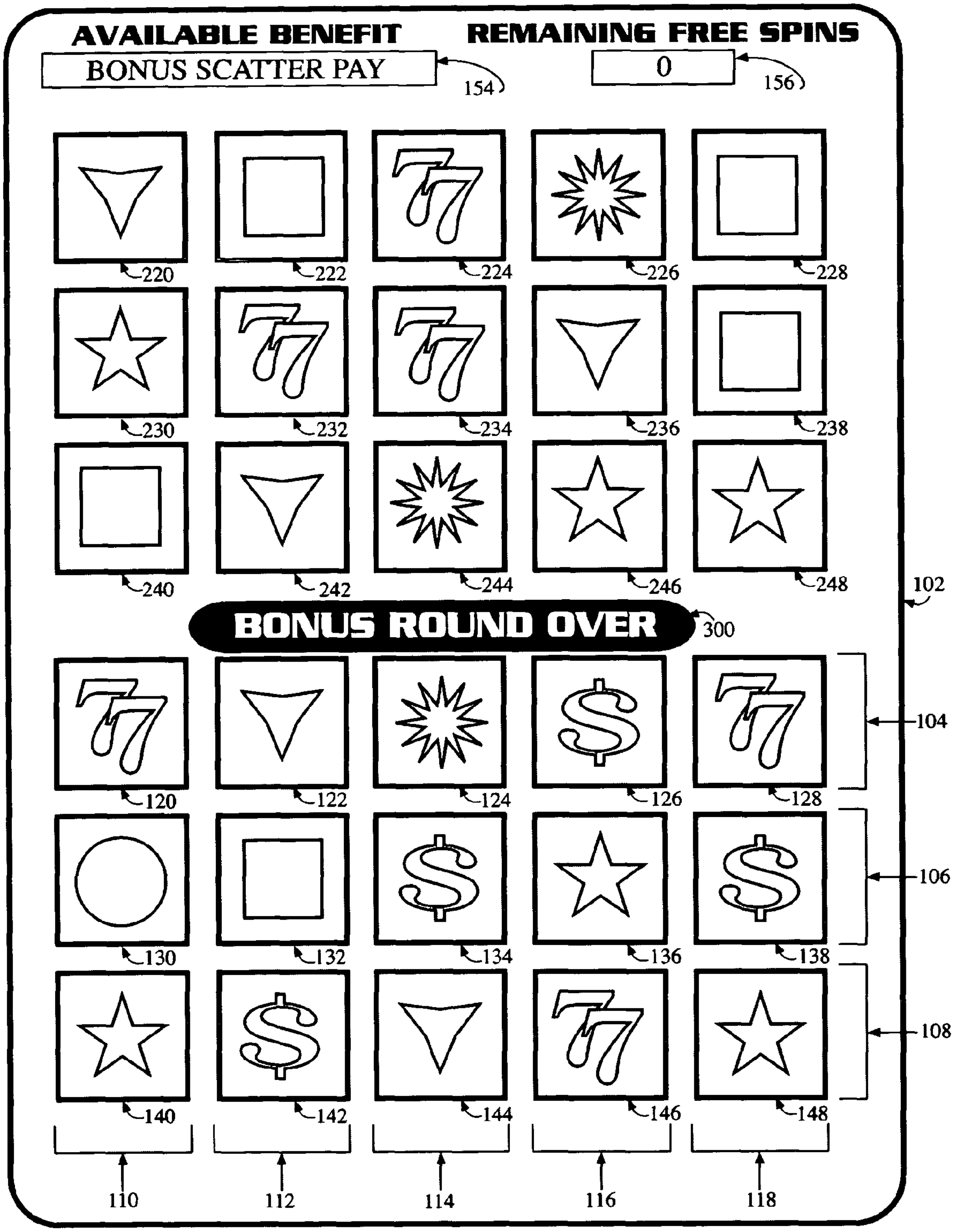
FIG. 16 shows the end result of the fifth and final free spin, the non-winning result comprising the first symbol game and the secondary symbol game, and a message displayed to indicate that the Bonus Round is over.

FIG. 16 refers to the game elements shown in FIG. 15 with the result of the fifth spin being no wins, the Remaining Free Spins being now displayed as zero, the now Available Benefit still being a Bonus Scatter Pay. A messaging box 300 indicates that the Bonus Round is now over.

Figure 17:
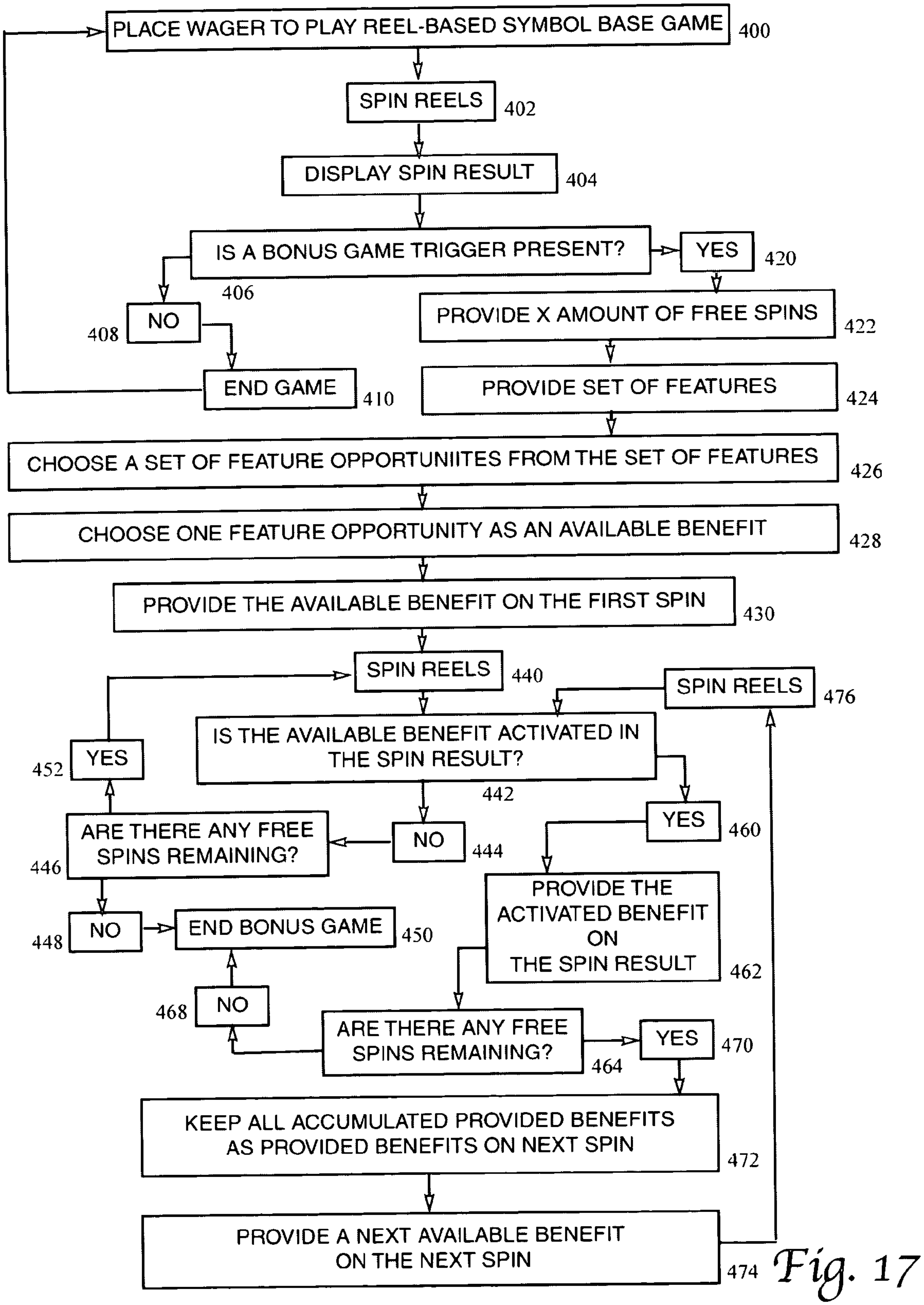
FIG. 17 is a flowchart of an embodiment of a dynamic accumulative bonus scheme routine.

FIG. 17 offers a flowchart of the present invention. The bonus gameplay routine is described as follows: A wager is placed in order to play the reel-based symbol base game 400. Upon receipt of the wager, the reels are spun 402, and the result of the spin is displayed 404. The symbol array result is examined in order to determine if a bonus game trigger (preferably a predetermined symbol result) is present 406. If the trigger is not detected 408, the game is ended 410 and another wager is then required in order to play the base game again 400. If the trigger is detected 420, a predetermined amount of free spins is offered as a bonus game 422. Before the first free spin, a set of features is provided 424 and may include at least free games, multipliers, wild symbols, additional paylines, additional spins, scatter pays, bonus rewards of credits, bonus rewards of currency, and bonus rewards of casino player points. A set of feature opportunities comprised from the set of features is randomly, non-randomly or pseudo-randomly chosen 426, the set of feature opportunities preferably equaling the amount of free spins. One feature opportunity is randomly, non-randomly or pseudo-randomly chosen as an Available Benefit 428. The same said Available Benefit is then provided on the first free spin 430. The reels are then spun for the first free spin of the free spins bonus 440. The resultant symbol outcome of the first free spin is displayed and examined in order to determine if the Available Benefit has been activated 442 (preferably by a predetermined symbol array being present in the resultant symbol outcome). If not 444, a determination is made as to whether or not there are any Remaining Free Spins 446. If not 448, the bonus game is ended 450. If there are any Remaining Free Spins 452, the reels are spun again for the next free spin 440. If the Available Benefit has been activated 460, the activated Available Benefit is provided on the spin result 462. A determination is then made as to whether or not there are any Remaining Free Spins 464. If not 468, the bonus game is ended 450. If there are any Remaining Free Spins 470, any and all activated and accumulated provided benefits are provided as activated benefits on the next spin 472. A new Available Benefit is provided on the next spin 474. The reels are spun 476 for this said next spin, and the same steps as previously described are performed.

Although specific examples and specific images have been provided in this discussion, these specifics are intended to be only support for the generic concepts of the invention and are not intended to be absolute limits in the scope of the technology discussed.

What is claimed:

1. A video gaming system comprising: at least one processor; a gaming apparatus having at least one input device and at least one display device; at least one memory device which stores a plurality of instructions which, when executed by the at least one processor, cause the at least one processor to operate with the at least one display device and the at least one input device to:

a) enable a player, using at least one input device, to make at least one wager on a video wagering game;

b) display on the display device a random array of symbols used to play the wagering game;

c) determine an outcome on the wagering game based on the random array of symbols;

d) determine if the outcome provides a bonus event that comprises at least some number X of multiple free spins, wherein each free spin comprises an independent random array of symbols with a single determinable outcome;

e) if the outcome provides the bonus event, provide a first available game benefit on the first one of the at least some number X of multiple free spins;

f) determine if the first available game benefit is achieved on the first free spin;

g) determine if the first free spin provides a winning outcome;

h) if the first available game benefit is achieved on the first free spin, provide the first available game benefit on all of the remaining at least some number X of free spins;

i) provide an additional available game benefit on the next free spin (X-Y, wherein Y=the amount of spins completed) if the available game benefit(s) was achieved on the free spin previous to the said next free spin (X-Y);

j) determine if the said additional available game benefit is achieved on the said next free spin (X-Y);

k) determine if the said next free spin (X-Y) provides a winning outcome;

l) if the said additional available game benefit is achieved on the said next free spin (X-Y), provide the said additional available game benefit on all of the remaining at least some number X of free spins;

m) repeat the method of steps i) through l) for each of the remaining at least some number X of free spins; and n) after completing all of the some number X of multiple free spins, provide an award equaling the accumulative value of all winning outcomes.

2. The video gaming system of claim 1 wherein if the first available game benefit is not achieved on the first spin, provide the same said first available game benefit on the next free spin (X-Y, wherein Y=the number of spins completed).

3. The video gaming system of claim 1 wherein if any additional available game benefit is not achieved on any specific free spin, provide the same said additional available game benefit on the next free spin (X-Y, wherein Y=the number of spins completed).

4. The video gaming system of claim 1 wherein each available game benefit is selected from the group consisting of at least a) a whole integer number of free spins, b) a whole integer number of free games, c) a multiplier, d) a wild symbol, e) a scatter pay f) a scatter symbol scheme with choice of symbols, g) a certain number amount of monetary credits, h) a certain number of non-monetary credits, i) a certain number amount of money, j) a prize article, k) a prize trip, l) a prize complimentary m) additional paylines and n) a bonus game different from the video wagering game.

* * * * *